May 9, 1961             E. FEHR             2,983,414
SKI-CARRIER FOR RELEASABLE FASTENING ON THE ROOF OF A MOTORCAR
Filed Dec. 27, 1957
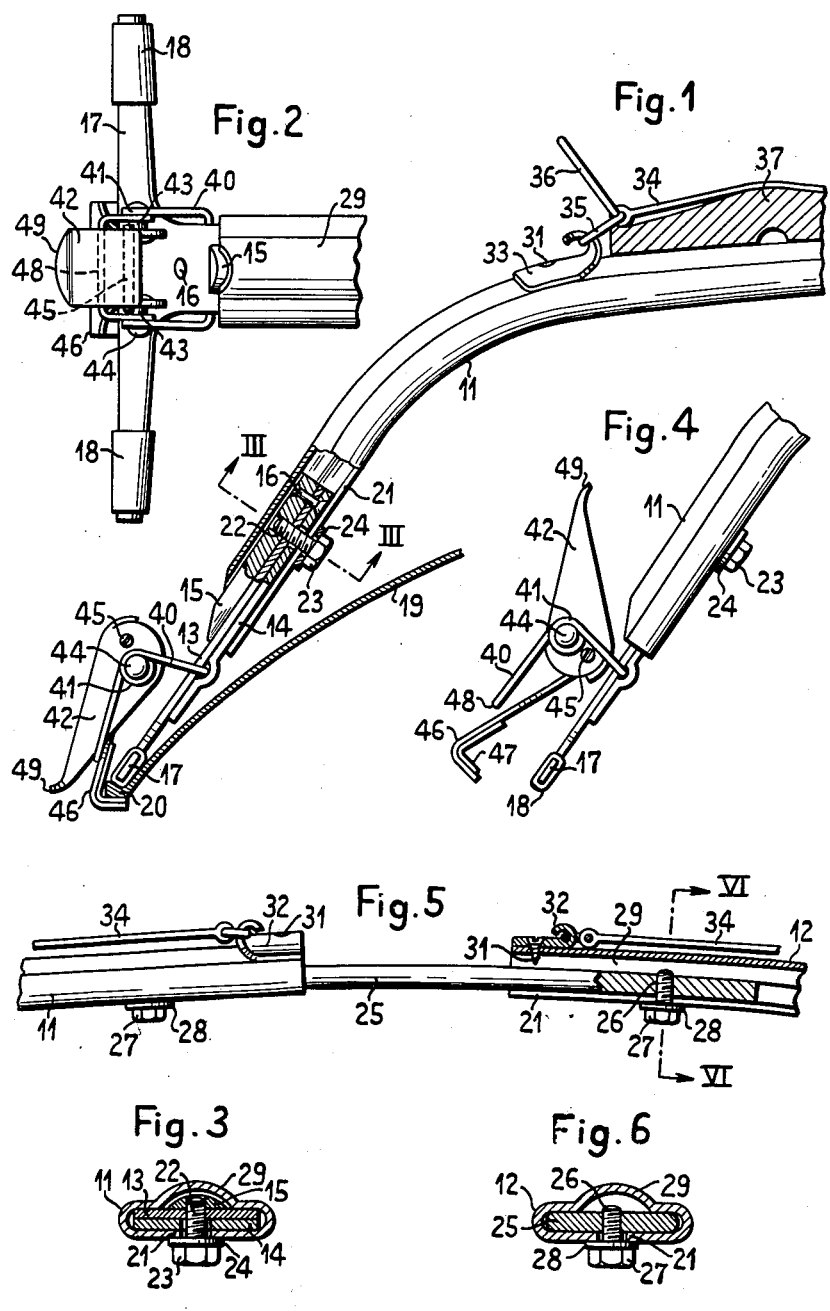
INVENTOR.
EUGEN FEHR

2,983,414
SKI-CARRIER FOR RELEASABLE FASTENING ON THE ROOF OF A MOTORCAR

Eugen Fehr, Hardrainstr. 37, Regensdorf, Switzerland

Filed Dec. 27, 1957, Ser. No. 705,669

1 Claim. (Cl. 224—42.1)

This invention relates to a ski-carrier intended for releasable fastening on the roof of a motorcar, and possessing a stirrup-shaped bar known per se, each end of which has arranged thereon a tension lever lock including a hook-shaped member adapted to engage under the edge of the roof, together with a spring U-bolt connecting the tension lever to the bar.

The ski-carrier according to the invention is characterized in that the spring U-bolt having the tension lever swivably supported thereon, engages beyond the hook-shaped member on its outturned side and is so designed that in the closed state of the lock the spring U-bolt rests on the hook-shaped member, securing the same from moving outwards.

Further features of the invention will appear from the following description and claims, taken in conjunction with the accompanying drawing which shows by way of example a preferred form of embodiment incorporating the invention.

In said annexed drawing:

Fig. 1 shows partly in view and partly in vertical section a fragmentary portion of a ski-carrier and ski fastened thereon, together with a roof of a motorcar having the ski-carrier mounted thereon;

Fig. 2 is a top view of one end portion of the ski-carrier;

Fig. 3 is a sectional view taken on the line III—III of Fig. 3, on a larger scale;

Fig. 4 shows a fragmentary portion of the ski-carrier with the tension lever lock open;

Fig. 5 represents parly in view and partly in vertical section the middle portion of the same ski-carrier;

Fig. 6 is a sectional view taken on the line VI—VI of Fig. 5, on a larger scale.

Referring to the drawing, the ski-carrier shown is substantially formed by a stirrup-shaped bar 11, 12, the end portions of which are bent down. The bar is divided in the middle and consists of two symmetrical parts 11 and 12, each having a hollow profile as shown especially in Figs. 3 and 6. In the bent down portion of each part 11 or 12 there is inserted a longitudinally slidable member 13—16 which comprises two flat pieces 13 and 14 together with a semi-circular profile piece 15 which parts are connected to each other by at least two rivets 16. At the bottom the flat piece 13 has a supporting member 17, the two limbs of which are surrounded by rubber sleeves 18. At each end of the ski-carrier the supporting member 17 is adapted to enter the water channel 20 on the roof of a motorcar body. The bar 11, 12 then extends above the roof 19 transversely across the motorcar.

Each of the parts 11 and 12 of the bar (11, 12) has a throughgoing longitudinal slit 21 which is provided in the side facing the roof 19. The parts 13—15 assembled to a unit have screwed therein a clamping screw 22 whose head 23 engages over the edges of the slit 21. The screw 22 passes through the slit 21 and serves to secure the member 13—16 in the position set each time. Interposed between the head 23 and edges of the slit 21 is a washer 24. With screw 22 slackened, the respective supporting member 17 may be adjusted in relation to the bar 11, 12. Thus the ski-carrier may be fitted on roofs 19 with curvatures differing in height.

In the middle of said bar, its two parts 11 and 12 are connected to each other by a rail 25 which slidably engages the hollow profiles of both said parts. Each end portion of the rail 25 has screwed therein a clamping screw 26 whose head 27 engages outside over the edges of the slit 21 of the hollow profile. Interposed between said edges and head 23 is a washer 28. With clamping screws 26 slackened, the parts 11 and 12 may be adjusted endwise in relation to the rail 25, the latter sliding in the hollow parts 11 and 12. In this way the ski-carrier may be fitted on roofs 19 differing in width. By tightening the head 27, the parts 11 and 12 of the bar may be fixed with respect to each other and to the rail 25.

In a modified form of embodiment (not shown), the rail 25 may be securely and undetachably connected to one of the parts 11 and 12 so that only the other part of the bar may be adjusted in relation to the rail 25.

As may be seen from the drawing, the hollow profile of the parts 11 and 12 has on its side, away from the slit 21 and roof 19, a bulging 29 which extends over the whole length of the parts 11 and 12. Between the rail 25 and the bulged wall of the hollow profile a space is thus created, into which the ends of the mounting screws 31 project without extending into the path of movement of the rail 25. The two parts 11 and 12 have several hooked members 32 and 33 attached thereto by said screws 31. Anchored to each of the members 32 is one end of holding straps 34 made of rubber, the other end of which carries an eyelet 35 with handle piece 36. The eyelets 35 are removably attached to the members 33, as shown in Fig. 1. The parts 32—36 are holding means adapted to secure in a simple and known manner the skis 37 laid on the ski-carrier.

It has still to be mentioned that the semi-circular profile piece 15 of each member 13—16 fits into the bulging 29 of the hollow profile of the bar parts 11 and 12, respectively, as shown in Figs. 1 and 3 for the part 11. This profile piece 15 merely serves to improve the appearance of the ski-carrier.

It is, however, conceivable to have the bulging 29 extending not over the whole length of the parts 11 and 12, but only over the substantially horizontal portion thereof. In this case the semi-circular profile pieces 15 are not provided.

The flat pieces 13 and 14 have swivably supported therebetween the ends of the limbs of the U-shaped spring bolts 40. At each end of the bar 11, 12 there is provided such a single spring bolt 40. The middle portion of each limb of said spring bolt 40 is bent into a turn 41. A tension lever 42 has two axle bolts 43 with end heads 44. Around said axle bolts 43 extend the windings 41 which are secured from displacement in axial direction of the bolts 43, on the one hand by the heads 44, and on the other hand by the tension lever 42 itself. The tension lever 42 is thereby swivably supported on the spring U-bolt 40.

Eccentric to said axle bolts 43, the tension lever 42 has fixed thereto a pin 45 on which a hook-shaped part 46 is swivably mounted. The latter is intended to engage under the edge 20 of the roof 19. The inner surfaces of the hook-shaped part 46 engaging the edge 20 are lined with a layer of some resilient material, say, leather. The arm 48 of the spring U-bolt 40 engages over the hook-shaped part 46 on its outwardly turned side. The free extremity 49 of the tension lever 42 is designed as a handle. The parts 49—49 together constitute a tension lever lock. The tension lever 42 is so designed and arranged that its portion 49 serving as handle points downwards if the tension lever lock is in its closed position as shown in Figs. 1 and 2.

To open the lock, the handle 49 is swiveled upwards as in Fig. 4. The hook-shaped part 46 may then be swiveled outwards and be brought into and out of engagement with the edge 20 of the roof. To secure the ski-carrier on the motorcar body, the hook-shaped part 46 at each end of the ski-carrier is swiveled under the edge 20 of the roof, whereupon the handle 49 of the tension lever 42 is pressed down. The pin 45 then moves upwards, whereby the hook-shaped part 46 is drawn tight on the edge 20. At the same time the axle bolts 43 move downwards and inwards, that is to the right in Figs. 1 and 4, the arm 48 of the spring U-bolt 40 engaging the hook-shaped part 46 and is pressed against it under the influence of the elasticity of the bolt 40. On swiveling the tension lever handle 49 right down, the pin 45 will be located beyond the dead point position, and the spring U-bolt 40 then tends to swivel the tension lever further in the way of locking, but this is rendered impossible by the tension lever 42 being stopped against the arm 48 of the spring bolt 40. By the tension of the spring bolt 40 the lock is consequently kept in its closed position, in which the arm 48 of the spring U-bolt 40 rests against the outer side of the hook-shaped part 46, thus securing the same from swiveling outwards, that is away from the edge 20 of the roof. If the skiholder has to be removed from the roof 19, all that has to be done is to turn the tension levers 42 upwards at both ends of the skiholder and then to swivel the hook-shaped part 46 outwards, whereupon the skiholder can be lifted off upwards.

In actual use of the aforedescribed skiholder, two such units are arranged at some distance apart on the roof of the motorcar, in order that each ski 37 may be supported at two places.

The main advantage of the described skiholder over such that have hitherto become known lies in the fact that, on locking the tension levers 40—49, the hook-shaped parts 46 are automatically secured in their effective position and prevented from moving outwards. Another advantage lies in its suitability for roofs of differently high curvature. By this it will be achieved that practically one or two different sizes of these skiholders need be manufactured and kept in stock, nevertheless ensuring that one of these embodiments may be fitted on any of the motorcars at present on the market.

What I claim is:

In a carrier for skis and like articles for a motorcar having a top with water channels along the sides of said top, a bar, clamp means connected to opposite ends of the said bar for attaching said carrier to said top, said clamp means each comprising a supporting member fixed to said carrier and adapted to engage the corresponding water channel, U-shaped spring means hinged by the ends of its limbs to each end of the bar at a distance from said supporting member, the middle portion of each limb of said spring means being bent into a winding of about one and a quarter turns toward said supporting member, a tensioning lever hinged to said spring means by bolts extending through the windings of said spring means, and a hook-shaped member swivably mounted to said tensioning lever by means of a pin eccentric to said bolts, said hook-shaped member being adapted to engage the under face of the corresponding water channel, said spring means being adapted to press on the outward side of said hook-shaped member to secure it in position when, by means of said tensioning lever, said hook-shaped member is urged upwardly against the under face of the water channel.

References Cited in the file of this patent

UNITED STATES PATENTS

| | | |
|---|---|---|
| 2,450,090 | Hunt | Sept. 28, 1948 |
| 2,683,265 | Wayne | July 13, 1954 |
| 2,720,350 | Felton | Oct. 11, 1955 |
| 2,752,079 | Merrill | June 29, 1956 |

FOREIGN PATENTS

| | | |
|---|---|---|
| 690,148 | Great Britain | Apr. 15, 1953 |
| 699,968 | Great Britain | Nov. 18, 1953 |
| 304,925 | Switzerland | Apr. 1, 1955 |
| 208,109 | Switzerland | Mar. 16, 1940 |